United States Patent [19]

Gruber et al.

[11] 4,284,776

[45] Aug. 18, 1981

[54] RADIATION CURABLE MICHAEL ADDITION AMINE ADDUCTS OF AMIDE ACRYLATE COMPOUNDS

[75] Inventors: Gerald W. Gruber, Sewickley; Charles B. Friedlander, Glenshaw; William H. McDonald, Arnold; Rostyslaw Dowbenko, Gibsonia, all of Pa.

[73] Assignee: PPG Industries, Inc., Pittsburgh, Pa.

[21] Appl. No.: 858,973

[22] Filed: Dec. 9, 1977

[51] Int. Cl.$^3$ .................. C07D 295/10; C07D 211/08
[52] U.S. Cl. ..................................... 544/400; 544/168; 546/247; 556/418; 556/419; 560/170; 560/171; 204/159.15
[58] Field of Search ................ 260/268 PL; 560/170, 560/171; 556/418, 419; 546/247

[56] References Cited

U.S. PATENT DOCUMENTS

| | | | |
|---|---|---|---|
| 3,925,349 | 12/1975 | Gaske | 204/159.15 |
| 4,001,304 | 1/1977 | Nyi et al. | 260/486 R |
| 4,045,416 | 8/1977 | Robson | 260/89.5 N |

*Primary Examiner*—Anton H. Sutto
*Attorney, Agent, or Firm*—George D. Morris

[57] ABSTRACT

Radiation polymerizable acrylyloxy-containing reaction products are provided from Michael addition reaction of an amide acrylate material with a primary or secondary amine. The resulting amine adducts of the amide acrylate compounds possess high cure rates in air.

11 Claims, No Drawings

RADIATION CURABLE MICHAEL ADDITION AMINE ADDUCTS OF AMIDE ACRYLATE COMPOUNDS

BACKGROUND OF THE INVENTION

1. Field of the Invention

Radiation sensitive compounds which polymerize rapidly are useful in compositions for forming protective and decorative film coatings for a wide variety of substrates. Of particular interest are radiation polymerizable compounds which cure rapidly under ambient atmospheric conditions to form mar-resistant coatings.

2. Description of the Prior Art

There is significant demand for radiation sensitive compounds which cure rapidly under ultraviolet light or ionizing radiation to form protective films, which curing properties are not inhibited by the presence of oxygen at concentrations as high as that of the ambient atmosphere. For example, U.S. Pat. No. 3,925,349 discloses the Michael addition reaction products of an amine and a polyacrylate which provide radiation curable compositions having high cure rates without oxygen inhibition. U.S. Pat. No. 4,045,416 describes radiation polymerizable amine diacrylates for fast-curing, film-forming compositions. Another class of highly radiation sensitive compounds which cure rapidly in the presence of oxygen consists of the amide acrylate compounds disclosed in U.S. application Ser. No. 821,856, filed Aug. 4, 1977 of Gerald W. Gruber et al, incorporated herein by reference. These amide acrylate compounds are of relatively low viscosity and thus impart to coating compositions the properties of ease of application, processing and handling; moreover, the compositions cure to hard, yet flexible, protective coatings.

SUMMARY OF THE INVENTION

It has now been found that fast curing radiation curable compositions may be provided by inclusion in the compositions radiation polymerizable amino amide acrylate compound which is characterizable as acrylyloxy-containing reaction product derived from the reaction of (a) acrylyloxy-containing compound of the formula

wherein X, Y and Z may each independently be hydrogen, alkyl, aryl, acrylyloxy-alkyl, acrylyloxy aliphatic ester or acrylyloxy aliphatic ether, with (b) at least one member selected from the group consisting of ammonia, a primary amine and a secondary amine.

Compositions having one or more of the described amino amide acrylate compounds possess the combined advantages of potentially low viscosity, high cure rate and lack of oxygen inhibition, especially under ultraviolet light curing conditions. Furthermore, films formed from these compositions have the properties of good flexibility, mar-resistance and high gloss. Compositions having this particular combination of advantages and properties are extremely useful as varnish overprint coatings for paper and paperboard substrates, such as magazines and record jackets, in which application the cost of protective or decorative packaging in relation to that of the packaged goods must be low.

An additional advantage of coating compositions containing amino amide acrylate compound is that the amine moiety, which is believed to accelerate the compound's cure rate, is chemically reacted into the compound so that there is less likelihood that the amine will leach out of the cured film. Moreover, with the amine accelerator incorporated into the chemical structure of the polymerizable compound, the problems of toxicity, odor and volatility generally associated with amines which are merely dissolved or mixed into a coating composition are avoided.

DESCRIPTION OF THE PREFERRED EMBODIMENTS

The radiation polymerizable acrylyloxy-containing compound of the invention comprises the amine adduct reaction products prepared by the Michael addition reaction of an amide acrylate with ammonia or a primary amine or a secondary amine.

Where the amide acrylate starting material is a monoacrylate, that is, it substantially comprises compound having one acrylyloxy group per molecule, it is necessary that the second reactant be a primary or secondary amine containing at least one hydroxyl group, such as an aminoalcohol. The aminoalcohol reacts by Michael addition with the acrylyloxy group of the amide monoacrylate to form an amine adduct of the amide acrylate substantially free of cross-linkable acrylyloxy groups. To provide a cross-linking acrylyloxy group in the amino amide acrylate, it is then necessary to react an acrylating material, having a functional group reactive with a hydroxyl group, with amino amide acrylate adduct containing a hydroxyl group contributed from the aminoalcohol. Suitable acrylating materials include compounds having acrylyl groups or α-substituted acrylyl groups such as methacrylyl, ethacrylyl and α-chloroacrylyl. These compounds must also contain functionality reactive with the hydroxyl group of the amino amide acrylate adduct. Appropriate specific acrylating materials include acrylic acid, methacrylic acid, ethacrylic acid, α-chloroacrylic acid and acrylyl chloride, and mixtures of these materials. Preferred compounds are acrylic acid and methacrylic acid.

Suitable amide mono-acrylate starting materials include those illustrated by formulae II and III

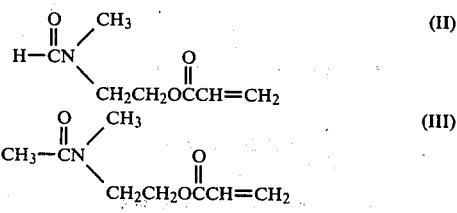

Where the amide acrylate starting material is an amide polyacrylate, having two, three or four acrylyloxy groups per molecule for example, practically any suitable amine may be used to make the adduct, including the aminoalcohol reactants. The aminoalcohols would, thus, provide sites for acrylyloxy addition as described above so that the reaction product could have several acrylyloxy moieties per molecule substituted at various positions X, Y and Z of general formula I, or have a plurality of acrylyloxy groups at one of the substituted positions. Where the amine reactant has no hydroxyl group to provide a site for addition of a compound having an acrylyloxy group, such as ammonia, or an alkyl or aryl substituted primary amine or secondary amine, the amide acrylate starting material will then preferably comprise amide di-, tri-, or tetra-acrylate compound.

Suitable amide acrylate starting materials having a plurality of acrylyloxy groups include those illustrated by formulae IV through XIV:

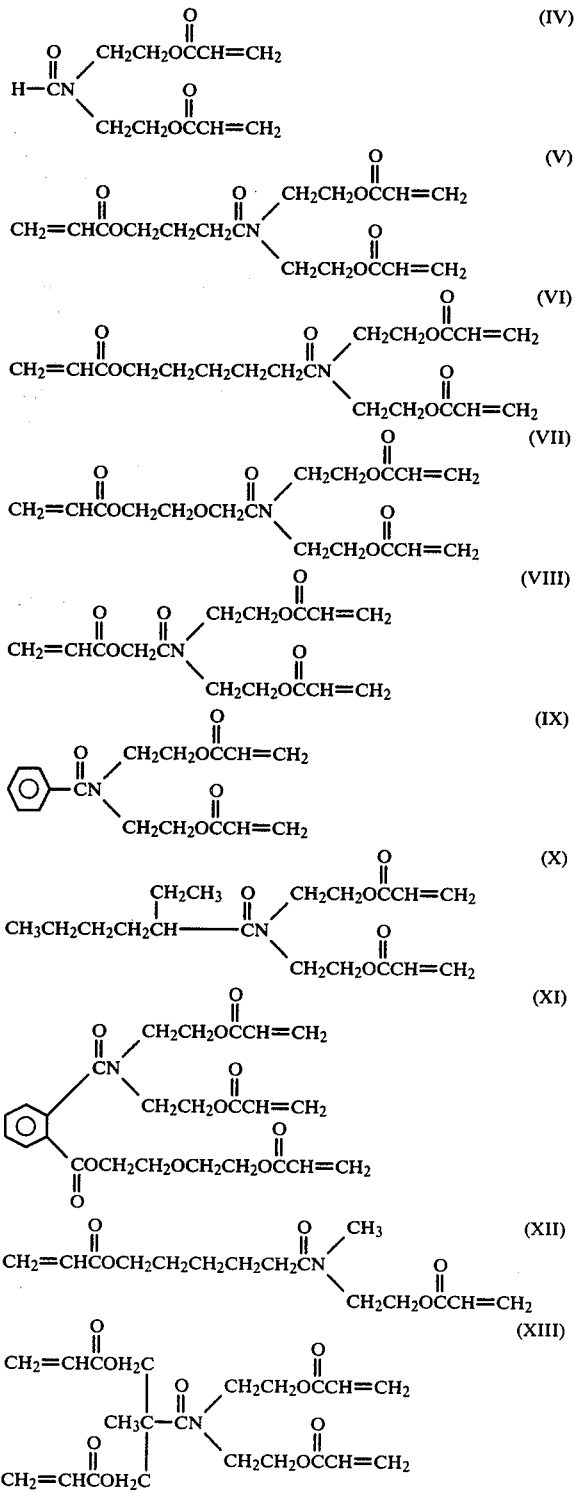

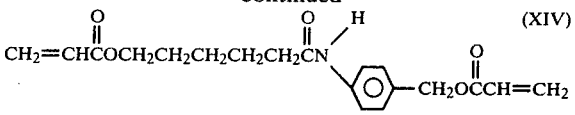

The amide acrylate compounds shown above may be formed by firstly reacting a compound selected from the group consisting of a carboxylic acid, an ester of a carboxylic acid, a hydroxy acid and an inner ester of a hydroxy carboxylic acid, such as a lactone, with an aminoalcohol to form an amide-containing hydroxy group terminated intermediate. The intermediate is then reacted with a compound having acrylic functionality and having a functional group reactive with the hydroxy group of the intermediate to form an acrylate-terminated amide-containing compound.

Suitable starting carboxylic acid compounds for making the amide-containing hydroxy terminated intermediate include formic acid, acetic acid, propionic acid, butyric acid, valeric acid, caproic acid, lauric acid, palmitic acid, stearic acid, oleic acid, benzoic acid, the ortho, meta and para isomers of toluic acid, phthalic acid and 2-ethylhexanoic acid. Especially preferred of these are formic, benzoic, and 2-ethylhexanoic acids.

Suitable also as a class of starting materials are the ester cognates of the aforementioned carboxylic acids. Especially preferred carboxylic acid esters include methyl formate and ethyl acetate.

A third class of useful starting materials comprises hydroxy acids. Preferred compounds of this class include α-hydroxy acids like glycolic acid. A preferred aromatic hydroxy acid is derived from the reaction of phthalic anhydride and diethylene glycol.

A fourth class of useful starting materials comprises inner esters of hydroxy carboxylic acids, such as γ-butyrolactone, γ-valerolactone, and ε-caprolactone.

Suitable aminoalcohol compounds for reaction with the aforementioned starting materials to form amide hydroxy containing intermediates include ethanolamine, diethanolamine, N-methylethanolamine, N-ethylethanolamine, N-phenylethanolamine, 2-amino-1-butanol, 4-amino-1-butanol, 2-amino-2-ethyl-1,3-propanediol, 6-amino-1-hexanol, 2-amino-2-(hydroxymethyl)-1,3-propanediol, 2-amino-3-methyl-1-butanol, 3-amino-3-methyl-1-butanol, 2-amino-4-methyl-1-pentanol, 2-amino-2-methyl-1,3-propanediol, 2-amino-2-methyl-1-propanol, 5-amino-1-pentanol, 3-amino-1,2-propanediol, 1-amino-2-propanol, 3-amino-1-propanol, and hydroxyalkyl anilines like p-aminobenzyl alcohol.

The intermediate product formed from the aforementioned starting materials comprises one amide group and one or more reactive hydroxyl groups. This amide hydroxy containing product is reacted with a compound having acrylic functionality and having a functional group reactive with a hydroxyl group of the amide intermediate.

Suitable acrylating materials for reacting with the amide intermediate include compounds having acrylyl groups or α-substituted acrylyl groups such as methacrylyl, ethacrylyl and α-chloroacrylyl. These compounds must also contain functionality reactive with the amide intermediate hydroxyl group. Appropriate specific acrylating materials include acrylic acid, methacrylic acid, ethacrylic acid, α-chloroacrylic acid and acrylyl chloride, and mixtures of these materials. Preferred compounds are acrylic acid and methacrylic acid.

Amide acrylate compounds of the types described by the aforementioned general and specific formulae may be generally prepared by reacting together approximately equimolar amounts of a starting material selected from the designated classes with an aminoalcohol. The reactants when heated under refluxing conditions typically form an azeotropic boiling mixture. Volatile products formed by the reaction, such as water, ethanol, methanol, or others, depending upon the choice of reactants, may be collected and removed from the reaction mixture by conventional methods. The hydroxyl containing amide intermediate compound is then reacted with suitable acrylating materials to form the amide acrylyloxy containing compounds. It is generally preferred that an amount of acrylating compound be mixed with the intermediate which is stoichiometrically equivalent to the reactive hydroxyl group functionality of the intermediate, although an excess or deficiency of acrylating compound is not all harmful.

Suitable aminoalcohols which may be used to react with the exemplified amide mono-acrylates include those aminoalcohols set forth for use in making the amide hydroxy containing intermediate. Preferred aminoalcohols are ethanolamine, diethanolamine, N-methylethanolamine, N-ethylethanolamine and N-phenylethanolamine. Especially preferred are diethanolamine and N-methylethanolamine.

Suitable amines which may be reacted with the amide acrylates having a plurality of acrylyloxy groups include most alkyl or aryl substituted primary and secondary amines capable of undergoing the Michael addition reaction. There must, however, be at least one reactive hydrogen atom attached to the amine nitrogen atom. Examples of representative amines are methylamine, ethylamine, isopropylamine, n-butylamine, hexylamine, neoheptylamine, 2-ethylhexylamine, decylamine, aminomethyltrimethoxysilane, aminoethyltriethoxysilane, aminoethyltributoxysilane, aminobutyltriethoxysilane, aminopentyltriethoxysilane, aniline, tolylamine, xylylamine, naphthylamine, benzylamine, phenethylamine, cyclopentylamine, methylcyclopentylamine, cyclohexylamine, dimethylcyclohexylamine, dimethylamine, diethylamine, diisopropylamine, dibutylamine, dioctylamine, N-methylamine, morpholine, piperazine, 2-methylpiperazine, N-methylpiperazine, N-propylpiperazine, piperidine, 2-ethylpiperidine, 4,4'-dipiperidyl-1,3-di(4-piperidyl)propane, 1,5-di(4-piperidyl)pentane, and the like. Ammonia has also been found useful as a reactant with the specified amide acrylate starting materials.

It should be mentioned that it is intended that the term "acrylyloxy", as used to describe acrylate or acrylating compounds to make both the amide acrylate starting materials and the amino amide acrylate adducts, includes both unsubstituted and α-substituted acrylates.

The amino amide acrylate compound of this invention is generally prepared by mixing together until reacted one of the described arylyloxy-containing amide acrylate compounds with one or more of the aforementioned amines; heat may or may not be applied, depending on the character of the starting materials. Where the amine is one having substituted groups other than a hydroxyl group, it is required that the amide acrylate starting material have at least two acrylyloxy moieties per molecule and that the amine be present in a stoichiometrically deficient amount so that the Michael addition reaction product comprises substantially amino amide acrylate having at least one ethylenically unsaturated group per molecule. Where the amine is an aminoalcohol, it may be any of the aforementioned hydroxy-containing amines having at least one hydroxyl group per molecule.

Whether the amine is of the hydroxy-substituted type or lacks hydroxy groups, the amine may be added all at once to the amide acrylate compound, although it is preferred that the amine be added gradually to the acrylyloxy-containing amide acrylate compound.

The amino amide acrylate may also be prepared at the same time as preparation of the amide acrylate starting materials to give a reaction product comprising only amino amide acrylate as the curable monomer or a mixture of curable acrylated products comprising both amide acrylate and amino amide acrylate. The general method for preparation of the amide acrylate has been set forth above. This method is modifiable by reacting an equivalent weight excess of an amino alcohol with a compound selected from the group consisting of a carboxylic acid, an ester of a carboxylic acid, a hydroxy acid and an inner ester of a hydroxy carboxylic acid, to form an amide-containing hydroxy-group terminated intermediate. Then this intermediate is reacted with an acrylic group-containing compound to form an acrylate terminated amide-containing compound. A portion of the amide acrylate product may then react with a portion of the equivalent weight excess of the aminoalcohol to form a compound containing amino, amide and hydroxyl groups, which hydroxyl group may react with one of the aforementioned acrylating agents to furnish at least one acrylyloxy group in the amino amide acrylate adduct.

The latter method is also modifiable inasmuch as the aminoalcohol reactant could be added gradually to a reaction vessel containing the components for making the amide hydroxy intermediate as the intermediate is formed, which intermediate may then be acrylated. Then the resulting amide acrylate may be reacted with the gradually added aminoalcohol, which reaction product is then reacted with acrylic acid or a like acrylating material.

Or in a reaction vessel containing a mixture of amide acrylate and amide hydroxy-containing intermediate, the aminoalcohol reactant could be generated from the degradation of a portion of the amide hydroxy-containing intermediate, which aminoalcohol could then react with a portion of the amide acrylate present to form a mixture of amide acrylate and amino amide acrylate adduct having a hydroxyl group then reacted with a suitable acrylating agent.

Thus, the final reaction mixture in each case would contain a mixture of amide acrylate and amino amide acrylate radiation curable compounds.

In any of the methods of preparation wherein an aminoalcohol is used as a reactant with an amide acrylate, the hydroxyl group of the reaction product, which comprises a compound having at least one each of amino, amide and hydroxyl groups, may be reacted with any of the aforementioned acrylating materials containing both an acrylyloxy group and a functional group reactive with a hydroxyl group, to provide an acrylyloxy-containing radiation curable amino amide acrylate.

The amino amide acrylate compounds of the invention are useful as radiation-curable components of film-forming coating compositions. The described amino amide acrylates may be homopolymerized, copolymerized or interpolymerized by ionizing radiation or by actinic light. The compounds of the invention may be copolymerized or interpolymerized with other acrylate compounds. Where mixtures of acrylate monomers are desired, alkyl hydroxy containing compounds such as simple glycols may be reacted with an acrylating agent, or with mixtures of acrylating agents, at the same time the hydroxy containing amide intermediates of the invention are acrylated. For example, trimethylolpropane may be reacted with acrylic acid to form a triacrylate monomer. This mixture of acrylates may then be exposed to curing conditions to form interpolymerized acrylate polymer films. Also, mixtures of amino amide acrylates may be utilized as the curable component of a film-forming composition.

When the amino amide acrylates of the present invention are utilized as components in film-forming compositions, the amount of the component in the composition can vary from 1 to 100 percent. Usually, the concentration of the component ranges from 2 to 40 percent. Where coating compositions of the invention are comprised of less than 100 percent amino amide acrylate compound, a copolymerizable reactive solvent selected from any of the conventional ethylenically unsaturated monomer materials that are radiation curable may comprise a major or minor component of the film-forming composition. General classes of such reactive functional monomer compounds include acrylates, styrenes, vinyl amides, esters of vinyl alcohols, maleate esters and fumarate esters. The amount of functional monomer in the composition can vary from zero to 99 percent. Usually, the amount of monomer will range from 30 to 50 percent.

The radiation curable coating composition may consist of substantially only the amino amide acrylyloxy-containing reaction product dissolved in reactive solvent, but other materials are often also present.

When the coating composition is to be cured by exposure to ultraviolet light photoinitiator, photosensitizer or a mixture of photoinitiator and photosensitizer is usually present.

Photoinitiators are compounds which absorb photons and thereby obtain energy to form radical pairs, at least one of which is available to initiate addition polymerization of acrylic or methacrylic groups in the well-known manner. Photosensitizers are compounds which are good absorbers of photons, but which are themselves poor photoinitiators. They absorb photons to produce excited molecules which then interact with a second compound to produce free radicals suitable for initiation of addition polymerization. The second compound may be a monomer, a polymer or an added initiator. Examples of photoinitiators are benzoin, methyl benzoin ether, butyl benzoin ether, isobutyl benzoin ether, α,α-diethoxyacetophenone, α-chloroacetophenone and methylphenyl glyoxylate. Examples of photosensitizers are benzil, 1-naphthaldehyde, anthraquinone, benzophenone, 3-methoxybenzophenone, benzaldehyde and anthrone.

The amount of photoinitiator, photosensitizer or mixture of photoinitiator and photosensitizer present in the radiation curable coating composition can vary widely. When any of these materials are present, the amount is usually in the range of from about 0.01 to about 10 percent by weight of the binder of the coating composition. Most often the amount is in the range of from about 0.1 to about 5 percent by weight of the binder.

When the coating is to be cured by exposure to ionizing radiation, these materials are usually omitted from the coating composition, although their presence is permissible.

Extender pigments may be present in the composition, and when ultraviolet light is used to cure the film, it is preferred that the extender pigment be substantially transparent to ultraviolet light. Examples of ultraviolet light transparent extender pigments are silica, calcium carbonate, barium sulfate, talc, aluminum silicates, sodium aluminum silicates and potassium aluminum silicates.

Hiding and/or coloring pigment may optionally be present. When the pigment is of the ultraviolet light absorbing type and the coating composition is to be cured by exposure to ultraviolet light, the pigment should be used in amounts which do not preclude curing of the interior of the coating. Examples of hiding pigments are titanium dioxide, antimony oxide, zirconium oxide, zinc sulfide and lithopone. Examples of coloring pigments are iron oxides, cadmium sulfide, carbon black, phthalocyanine blue, phthalocyanine green, indanthrone blue, ultramarine blue, chromium oxide, burnt umber, benzidine yellow, toluidine red and aluminum powder. Individual pigments or mixtures of hiding and/or coloring pigments may be used.

Mixtures of extender pigments, hiding pigments and/or coloring pigments may also be employed.

Dyes in their customarily used amounts may be present in the coating composition.

Although not ordinarily desired, minor amounts, usually in the range of from about 0.1 to about 20 percent by weight of the vehicle, of volatile reactive solvent and/or inert volatile organic solvent may be present in the radiation curable coating composition.

Various additional materials may be added to adjust the viscosity of the coating composition. Examples of such materials are fumed silica, castor oil based compositions (e.g., Thixatrol ST, Baker Castor Oil Company), modified clays, 12-hydroxystearic acid, tetrabutyl orthotitanate and microcrystalline cellulose. When used, these materials are usually present in an amount in the range of from about 0.5 percent to about 15 percent by weight of the binder.

The radiation curable coating composition of the invention are usually prepared by simply admixing the solution of curable component dissolved in reactive solvent with such other ingredients as may be present. Although mixing is usually accomplished at room temperature, elevated temperatures are sometimes used. The maximum temperature which is usable depends upon the heat stability of the ingredients. Temperatures above about 120° C. are only rarely employed.

The radiation curable coating compositions are used to form cured adherent coatings on substrates. The substrate is coated with the coating composition using substantially any technique known to the art. These include spraying, curtain coatings, dipping, direct roll coatings, reverse roll coating, painting, brushing, printing, drawing and extrusion. The coated substrate is then exposed to radiation of sufficient intensity for a time sufficient to crosslink the coatings. The times of exposure to radiation and the intensity of the radiation to which the coating composition is exposed may vary greatly. Generally, the exposure to radiation should continue until the C-stage is reached when hard, solvent resistant films result. In certain applications, however, it may be desirable for the curing to continue only until the B-stage, viz., gel stage, has been obtained.

Substrates which may be coated with the compositions of this invention may vary widely in their properties. Organic substrates such as wood, fiberboard, particle board, composition board, paper, cardboard and various polymers such as polyesters, polyamides, cured phenolic resins, cured aminoplasts, acrylics, polyurethanes, and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc and alloys. Especially suitable substrates are those of paper or paperboard bearing printed or decorative indicia over which a fast-curing protective transparent or pigmented film is formed from compositions containing amino amide acrylate of the invention. The compositions are also suitable as fillers for porous materials like wood.

Cured coatings of the radiation curable coating composition usually have thicknesses in the range of from about 0.001 millimeter to about 3 millimeters. More often they have thicknesses in the range of from about 0.002 millimeter to about 0.3 millimeter, and most preferred are coatings ranging from 0.002 millimeter to 0.08 millimeter. When the radiation curable coating composition is a radiation curable printing ink, the cured coatings usually have thicknesses in the range of from about 0.001 millimeter to about 0.03 millimeter.

The coatings of this invention may be cured by exposure to ionizing radiation, the unit of dose of ionizing radiation being the "rad" which is equal to 100 ergs of energy absorbed from ionizing radiation per gram of material being irradiated. As used throughout the specification and claims, dose is referenced to the bleaching of calibrated blue cellophane film irrespective of the identify of the coating composition being irradiated.

The coatings of the invention may also be cured by exposure to actinic light. Actinic light, as used herein, is electromagnetic radiation having a wavelength of 700 nanometers or less which is capable of producing, either directly or indirectly, free radicals capable of initiating addition polymerization of the coating compositions of the invention. Usually photoinitiator, photosensitizer or mixtures of photoinitiator and photosensitizer are present to absorb photons and produce the free radicals, although in some cases, these materials are not needed. Actinic light possesses insufficient energy to produce ions in a medium composed of common elements such as air or water and hence, has an energy below about 10 electron volts. The most commonly used form of actinic light is ultraviolet light, viz., electromagnetic radiation having a wavelength in the range of from about 180 nanometers to about 400 nanometers, although actinic light of greater or shorter wavelength may also be used effectively.

Any suitable source which emits ultraviolet light may be used in the practice of this invention. Suitable sources are set forth in U.S. Pat. No. 4,017,652 to Gerald W. Gruber.

The times of exposure to actinic light and the intensity of actinic light to which the coating composition is exposed may vary greatly. In keeping with the general principles heretofore set forth, the exposure to actinic light should usually continue until the C-stage is obtained. However, for certain applications, the exposure may be stopped when the B-stage has been achieved.

The following examples, setting forth specific reactant quantities and conditions, specify certain additives, such as catalysts, diluents and surfactants for preparation of the amino amide acrylate compounds of the present invention. Unless otherwise indicated, all parts and percentages are by weight, and all viscosity values are from measurements of undiluted samples on the Gardner-Holt viscosity scale. These embodiments are not to be construed, however, as limiting the invention since there are numerous variations and modifications possible.

EXAMPLE I

A reaction vessel is equipped with an agitator, a heater, cooling means, a thermometer and a condensing apparatus designed for refluxing an azeotropic mixture, commonly known as a Dean-Stark trap. The vessel is charged with 544 parts of an intermediate reaction product, conventionally prepared by the reaction of equimolar amounts of formic acid and diethanolamine, together with 233 parts 1,1,1-trimethylolpropane, 785 parts glacial acrylic acid, 86 parts of a 0.1 percent solution of phenothiazine in toluene, 14 parts butylstannoic acid, 0.7 part hydroquinone and 386 parts toluene. The Dean-Stark trap is filled with toluene to aid in separation of the water component from the water-toluene azeotrope. With the apparatus set for maximum agitation and maximum azeotropic reflux, the reaction mixture is heated to about 107° C. in 20 minutes and then to about 110° C. in a subsequent one hour heating period. Water of reaction, separated from the volatile azeotrope and collected in the Dean-Stark trap, amounts to about 32 parts after the initial one hour and 20 minute heating period. The reaction mixture is then heated for eight hours and 30 minutes at 110°-121° C., with care being taken that the temperature of the reaction mixture does not exceed 127° C. At the end of the heating period, approximately 168 parts water is collected from the reaction vessel. The reaction mixture is then cooled to 49°-52° C. and filtered through a nylon bag into a storage container.

An airtight reaction vessel equipped with an agitator, a heater, cooling means, a thermometer and vacuum distillation apparatus is charged with about 181 parts of the reaction product from the aforementioned storage container. With application of a vacuum to the reaction vessel measured as 20-23 millimeters of mercury absolute pressure, the reaction product is heated to about 77° C. in two hours and 30 minutes. Approximately 34 parts of distillate, comprising mainly toluene, is collected during this initial heating period. The reaction product is then heated an additional hour at about 80° C. at 18 millimeters mercury absolute pressure. The amount of distillate collected remains at about 34 parts, thus indicating removal of most of the volatile solvent from the reaction product. The product is then cooled to about 52° C. and filtered through a 10 micron GAF filter into a storage container. The reaction product comprises compound of structural formula IV.

EXAMPLE II

A reaction vessel is equipped with an agitator, a heater, cooling means, a thermometer and a condensing apparatus. The vessel is charged with 104 parts ε-caprolactone and then under a nitrogen blanket the charge is heated to about 52° C. over a period of 30 minutes. Then over a period of 50 minutes, 95 parts of preheated diethanolamine is gradually added to the first charge, with care being taken during the exothermic reaction so that reaction mixture does not exceed 57° C. The temperature of the reaction mixture is then increased to 60°-63° C. and maintained at that temperature for about two hours and 40 minutes. Then 17 parts more ε-caprolactone is added to the reaction mixture, with gradual heating over a period of one hour to raise the temperature to 68°-71° C. The reaction mixture is held at 68°-71° C. for four hours after which time a base value is obtained of 18.2 (expressed as milliequivalents of back-titrated KOH per gram of sample). The amide triol intermediate product is then cooled to room temperature.

Into another reaction vessel equipped as before and having a Dean-Stark trap for removing water from an azeotropic mixture, there is introduced 109 parts of the aforementioned intermediate product together with 98 parts glacial acrylic acid, 2 parts butylstannoic acid, 0.013 part phenothiazine, 0.2 part hydroquinone and 39 parts toluene. The reaction mixture is then heated to about 114° C. in about 45 minutes at which time the apparatus is set for maximum agitation and maximum azeotropic reflux. For a period of approximately 10 hours, the reaction mixture is maintained at a temperature of 111°-126° C. during which time maximum reflux conditions are maintained. Approximately every hour during the reflux period, the acid value of the reaction mixture and the quantity of by-product water from the azeotropic distillation are measured. At the end of the reflux period, the acid value is 48.7 while approximately 19 parts water is collected. The reaction mixture is then cooled to about 52° C. before filtering through a 25 micron GAF filter into storage containers.

Approximately 227 parts of the unstripped resin-solvent mixture prepared above is placed in a vessel equipped with heating means and vacuum distillation apparatus. The mixture is heated while a vacuum is simultaneously established in the reaction vessel. The temperature is maintained at 77°-81° C. under vacuum conditions for about three and ¾ hours, after which time approximately 29 parts of volatile distillate is collected. The reaction product comprises compound of structural formula VI.

EXAMPLE III

To a reaction vessel equipped with heating and agitating means and a thermometer, there is added 120.5 parts of an amide acrylate reaction product comprising bis(acrylyloxyethyl)formamide prepared as generally set forth in Example I. After the contents of the vessel are heated to about 70° C. with agitation, there is added 54.5 parts diethanolamine to the reaction vessel dropwise and over a period of one hour. The reaction mixture is maintained at about 70° C. for three and ½ hours, after which time substantially none of the diethanolamine remains. The reaction mixture is then cooled and placed in a storage container.

EXAMPLE IV

To a reaction vessel equipped as in Example III, there is added 190 parts of an amide acrylate reaction product prepared as generally set forth in Example II. After the contents of the vessel are heated under a nitrogen blanket to about 50° C. with agitation, there is added 37.5 parts N-methylethanolamine to the reaction vessel dropwise and over a period of about 40 minutes. The reaction mixture is observed to undergo exothermic reaction, with the temperature rising to about 60° C. during the addition period, after which time substantially none of the N-methylethanolamine remains. The reaction mixture is maintained at about 50° C. for one hour and is then cooled and placed in a storage container.

EXAMPLE V

Coating compositions having acrylate compounds derived according to the previous examples are prepared by mixing together components according to the general formulations of Table I. Each of the compositions is applied to two unsealed paperboard panels with a 0.003 drawdown bar to a thickness of about 1 mil. The panels are subjected to ultraviolet radiation from a single 200 watt per inch mercury vapor lamp placed at a distance of about three inches from a conveyor carrying the panels. The panels are exposed to UV radiation under ambient atmospheric conditions. Table I lists cure rate data for each of the compositions.

TABLE I

| Composition No. | Amide Acrylate of Ex. I* | Amino Amide Acrylate of Ex. III* | Benzophenone* | Triethanolamine* | Cure Rate (ft./min.) | Mar Resistance |
|---|---|---|---|---|---|---|
| 1 | 250 | 0.5 | 5 | | 60 | Mar-free |
| | | | | | 80 | Slight mar |
| 2 | 250 | 1.0 | 5 | | 60 | Mar-free |
| | | | | | 80 | Mars |
| 3 | 250 | | 5 | 0.5 | 80 | Mar-free |
| | | | | | 100 | Mars |
| 4 | 250 | 2.0 | 5 | | 100 | Mar-free |
| | | | | | 120 | Mars |
| 5 | 250 | 5.0 | 5 | | 100 | Mar-free |
| | | | | | 120 | Slight mar |

*Components in parts by weight

Although specific examples of the instant invention have been set forth hereinabove, it is not intended that the invention be limited solely thereto; but is to include all the variations and modifications falling within the scope of the appended claims.

What is claimed is:

1. Radiation polymerizable acrylyloxy-containing compound comprising Michael addition adduct of
   (a) amide acrylate compound of the general formula

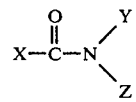

wherein X, Y and Z may each independently be hydrogen, alkyl, aryl, acrylyloxyalkyl, acrylyloxy aliphatic ester or acrylyloxy aliphatic ether, with the proviso that X, Y and Z together have at least two acrylyloxy groups, and
   (b) a stoichiometrically deficient amount of at least one member selected from the group consisting of a primary amine and a secondary amine.

2. The radiation polymerizable acrylyloxy-containing compound of claim 1 wherein
   X is hydrogen,
   Y and Z are each

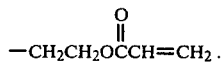

3. The radiation polymerizable acrylyloxy-containing compound of claim 1 wherein
X is

Y and Z are each

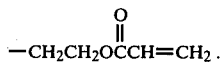

4. The radiation polymerizable acrylyloxy-containing compound of claim 1 wherein
X is

Y and Z are each

5. The radiation polymerizable acrylyloxy-containing compound of claim 1 wherein
X is

Y and Z are each

6. The radiation polymerizable acrylyloxy-containing compound of claim 1 wherein
X is

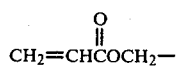

Y and Z are each

7. The radiation polymerizable acrylyloxy-containing compound of claim 1 wherein
X is

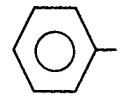

Y and Z are each

8. The radiation polymerizable acrylyloxy-containing compound of claim 1 wherein
X is

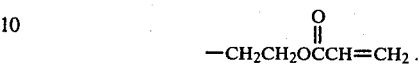

Y and Z are each

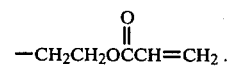

9. The radiation polymerizable acrylyloxy-containing compound of claim 1 wherein
X is

Y is —CH$_3$
Z is

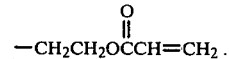

10. The radiation polymerizable acrylyloxy-containing compound of claim 1 wherein
X is

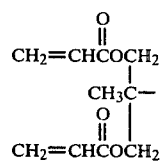

Y and Z are each

11. The radiation polymerizable acrylyloxy-containing compound of claim 1 wherein said amine is selected from the group consisting of methylamine, ethylamine, isopropylamine, n-butylamine, 2-ethylhexylamine, benzylamine, diethylamine, diisopropylamine, piperazine and piperidine.

* * * * *